Patented Aug. 25, 1942

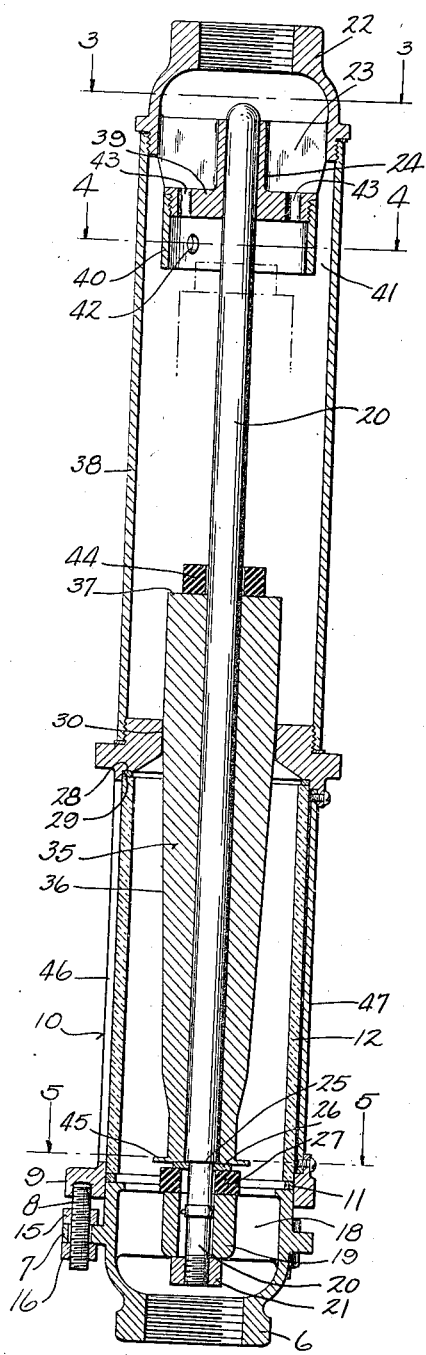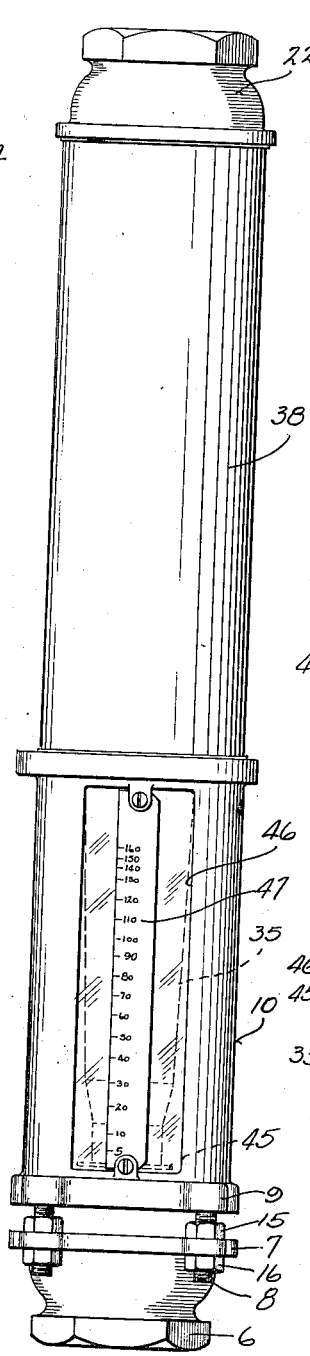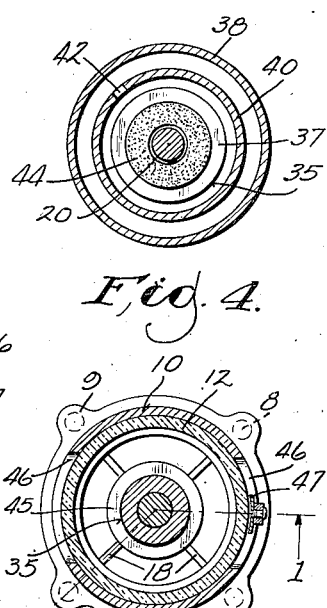

2,293,988

UNITED STATES PATENT OFFICE 2,293,988

FLOW METER

Emil M. Krueger, Milwaukee, Wis., assignor to Badger Meter Manufacturing Company, Milwaukee, Wis., a corporation of Wisconsin Application March 24, 1941, Serial No. 384,798

9 Claims. (Cl. 73—210)

This invention relates to improvements in flow meters. The present application is a companion to an application on similar subject matter filed of even date herewith. The present flow meter differs from that disclosed in the companion application in that it incorporates special features adapting it to handle larger volumes of flow.

It is the primary object of the present invention to provide a flow meter capable of registering fluid flow with great accuracy by floating a metering pin or plug in an aperture, the pin being biased toward a position in which it substantially fills the aperture and being so tapered that in its movement from said position it increases the effective area of said aperture until such area is effective to handle the entire flow therethrough. By floating or suspending the metering pin or plug in the current of fluid flowing through the aperture a very sensitive response is assured.

When the flow becomes extremely high there is a certain tendency for such a metering pin or plug to be carried by the current beyond a position properly indicative of the rate of flow. It is also an object of the present invention to provide in the flow meter structure a factor effective upon the plug only in the positions which the metering pin or plug occupies at extremely high rates of flow, such factor functioning to relieve the plug partially from the effect of eddy currents and friction tending to displace the pin or plug unduly under such circumstances.

A further object of the invention is to provide a special type of clamping arrangement for positioning the gauge glass used in this device, whereby the glass may be held under adequate clamping pressure without being subjected to distorting stress in such a manner as to tend to crack the glass.

A further object is generally to simplify and improve the construction, arrangement and operation for one or more of the purposes mentioned, and still other objects will be apparent from the specification.

In the drawing:

Fig. 1 is a view of a flow meter embodying this invention as it appears in section on the line 1—1 of Fig. 5.

Fig. 2 is a view of the device in side elevation.

Fig. 3 is a detail view taken in cross section on the line 3—3 of Fig. 1.

Fig. 4 is a detail view taken in cross section on the line 4—4 of Fig. 1.

Fig. 5 is a detail view taken in cross section on the line 5—5 of Fig. 1.

Like parts are identified by the same reference characters throughout the several views.

The flow meter comprises a barrel which is preferably made up of a number of sections, the lowermost of which constitutes the coupling 6 adapted to be connected to a suitable supply line, the fluid flow in which is to be metered.

Coupling 6 has ears 7 apertured to receive the studs 8 which project from a flange 9 of housing 10. The upper end of the coupling element 6 is telescopically receivable into the end of housing 10 and supports packing 11 for the tubular gauge glass 12, which is fitted within the housing to constitute the next section of the flow meter barrel.

The housing 10 has an annular head piece at its upper end to which is threaded a sleeve-like third section 38, the upper end of which is threaded to an outlet fitting or coupling member 22.

Each stud 8 carries a nut 15 above the ear 7 through which the stud projects and is provided below the ear with another nut at 16. In devices sufficiently large in cross section to provide the desired rate of flow, I have found that a cramping action dangerous to the tubular gauge glass 12 may be set up if the nut 15 is omitted or if one of the nuts 16 alone is unduly tightened upon the ear 7 to draw the housing 10 down and clamp the glass firmly on to the gasket. The pipe to which coupling 6 is fitted being rather heavy, the fitting 6 will be held with considerable rigidity and any tilting movement of the rest of the barrel with respect to fitting 6 will tend to cause the housing 10 to fulcrum upon one edge of the gauge glass 12, thereby frequently cracking or breaking the glass. By providing the nuts 15 to take all such cramping pressure by engagement with the upper surfaces of the respective ears 7, I am able to avoid subjecting the glass to this unnecessary strain.

Within the fitting 6 spider arms 18 support a hub 19 within which a guide rod 20 is anchored by nut 21. At the upper end of the barrel the coupling element 22 is provided with integral spider arms at 23 centrally supporting another hub at 24 within which the upper end of the guide rod 20 is positioned. No fastening means at the upper end of the rod is necessary, the rod having a shoulder at 25 engaging washer 26 which is supported by a rubber cushion 27 from the lower hub 19, the compression on the cushion being determined by the tightness of the nut 21.

The upper end of the housing 10 is internally shouldered at 28 to receive the gasket 29 against which the upper end of the gauge glass tube 12 is seated under compression provided by the tightening of the nuts 16 on studs 8. Disposed centrally in housing 10 is the orifice 30 through which fluid entering the gauge glass through fitting 6 must pass before being delivered upwardly through fitting 22 at the top of the meter. A metering plug or pin 35 is provided with a central bore to loosely receive the guide rod 29. Externally the pin has an elongated tapered surface at 36 so devised that as the pin is displaced from aperture 30 by pressure differential of fluid admitted to the barrel through fitting 6, the taper will afford a gradually increasing clearance between the metering plug or pin and the side wall of the orifice 30 which, in practice, will always correspond to the rate of fluid flow through the apparatus.

Thus the height at which the metering pin or plug floats suspended in the vertically moving fluid current will, throughout a very wide range, accurately correspond to the rate of flow. Any tendency of the metering pin or plug to move responsive to its gravity bias toward the position in which it is illustrated in Fig. 1 will, due to the taper of its sides, further restrict the space between the pin and the side wall of the orifice, with the result that a pressure differential will be set up again tending to lift the plug toward a position where the effective capacity of the orifice corresponds accurately to the rate of flow.

When the rate of flow becomes extremely high, the metering pin or plug will be subject to additional forces which will become effective thereon at high velocities to tend to move the pin or plug beyond the position in which the effective area of the orifice will exactly correspond to the rate of flow. The friction of the fluid stream is one factor. The aspirating effect and eddy current produced in the flow of the fluid stream about the square cut upper end 37 of the metering pin or plug is another factor. In order to minimize the effect of these factors and to confine the movement of the plug to a suitable range of barrel length in the sleeve 38 which connects the housing member 10 with fitting 22, I provide a stationary inverted cup which progressively restricts the flow about the end of the plug as it approaches its uppermost position, thereby reducing its response at the upper end of the frame and preventing it from being carried far beyond the position which it should occupy, even if liquid is suddenly admitted to the barrel under high pressure.

The spider arms 23 and the hub 24 integral with fitting 22 at the top of the barrel also support an inverted cup comprising a disk at 39 to which is secured a sleeve 40 spaced within the barrel sleeve 38 to provide ample clearance at 41 for fluid flow traversing the device. The space 41 opens between the spider arms 23 through fitting 22. A certain amount of fluid flow, however, is by-passed through the inner sleeve 40 and the disk 39. This prevents the sleeve 40 from performing any of the functions of a dashpot. The sleeve 40 is sufficiently large so that it does not have a close fit about the upper end of the metering pin or plug 35 but is substantially spaced therefrom as indicated in Fig. 1 by the showing of the metering pin in a dotted line position. Moreover, I preferably provide one or more apertures at 42 in the side of sleeve 40 and one or more apertures at 43 in the disk portion of the inverted cup.

The upper end of the metering pin or plug carries an annular cushion 44 so that in the event that fluid is abruptly admitted into the barrel, the resulting shock displacement of the metering pin or plug will be cushioned by engagement of the rubber annulus 44 with the disk portion 39 of the inverted cup on the upper fitting 22 of the device.

At its lower end the metering pin or plug 35 is provided with a pointer or indicator 45. Since the metering pin or plug is free to rotate upon the rod 29, being very loosely guided thereon, the indicator or pointer comprises a flange or disk 45 which, in order not to interfere with the flow of fluid across the tapered surface 36 of the plug is preferably located at some distance below the lowermost effective portion of such surface.

The housing 10 for gauge glass tube 12 is preferably provided at opposite sides with window openings 46, one of which is spanned by a calibrated gauge strip 47 screwed to ears integral with the housing. Thus, the position of the metering pin or plug corresponding to any given rate of fluid flow through the apparatus, is directly read by noting the relation of the pointer 45 to the calibrations of gauge strip 47 without requiring any transmission of motion through the wall of the device and consequently eliminating all of the friction of packing and the like.

The particular device disclosed is calibrated to show a range of flow suitable for use in measuring the flow of water, the calibrations covering a range from five gallons to 160 gallons per minute. At the lower rates of flow within this range the effect of water friction and the effect of eddy currents above the plug or pin are negligible. At higher rates of flow within this range these factors become increasingly significant and accordingly the graduations on the calibrated scale 47 would become wider and wider apart were it not for the provision of the cup 40 at the top of the barrel. Even before the metering plug or pin enters the cup, the effect of the cup upon movement of the pin becomes apparent. By the flange or sleeve 40 of the cup a portion of the flow is diverted to pass between such flange and the barrel sleeve 38. The remaining portion of the flow continues into the cup and is there trapped, building up a certain degree of back pressure, the amount of fluid entering the trap exceeding that which can escape therefrom through the openings. The specific effect of the trap may be varied as desired within the control of the designer by varying the shape and size of the cup and the number and locations of its openings.

In the particular device disclosed, the response of the metering plug or pin becomes decreased at the upper end portion of its range of movement so that the graduations on the gauge strip 47 become somewhat closer together as clearly shown in Fig. 2. This is desirable because it enables the device to cover a greater range without increasing the length of the barrel. It will, of course, be understood that the space between sleeve 40 and the barrel is of such size as to provide an annular passage of a capacity at least equal to that of the orifice 30 when the metering pin is in its raised position, the rates of flow being checked by the baffle and not by constriction.

I claim:

1. In a flow meter, the combination with a barrel provided with means having a metering orifice, of a tapered metering pin reciprocable axially of the orifice and biased for movement toward orifice closing position, means for guiding the pin axially of the orifice in its movement responsive to flow through the orifice, and a baffle member toward which said pin moves as maximum fluid flow through the orifice is approached, said baffle member comprising means for diverting a part of the flow from the end of the pin remote from the orifice while providing means permitting partial flow about said end.

2. In a flow meter, the combination with a barrel having an intermediate flow restricting annulus providing a metering orifice, of a tapered metering pin reciprocable axially of the orifice in response to variations in flow therethrough, means for loosely guiding the pin axially of the orifice, said pin being otherwise out of frictional contact or connection with any other portion of the device, and an inverted cup-shaped apertured baffle above the pin and annularly spaced from the wall of the barrel sufficiently to allow substantially maximum flow through such space, said baffle being adapted to check the current directly above the pin at maximum rates of flow and substantially offset the aspirating and frictional effects of the current on the pin.

3. A flow meter comprising the combination with means providing a metering orifice, of barrel sections above and below said means, supports at the opposite ends of the barrel sections, a guide rod connected between said supports, a tapered metering pin reciprocable along the rod and positioned thereby substantially axially of the orifice, and a cup-shaped baffle connected with one of said supports and comprising an apertured base portion and a sleeve extending therefrom toward said orifice, said sleeve being sufficiently large to provide clearance about said pin when its upper end is in registry with the baffle.

4. In a flow meter, the combination with a pair of spaced coupling elements, of tubular barrel sections therebetween, means intervening between said barrel sections providing a metering orifice, spider arms connected with the respective coupling elements, a guide rod positioned by the respective spider arms to extend axially through said orifice and barrel sections, a tapered metering pin reciprocable upon said guide rod in said orifice to provide varying cross sectional orifice areas according to the rate of flow through the orifice, and baffle means carried by the spider arms of the coupling element toward which said metering pin moves at high rates of flow, said baffle means comprising a sleeve spaced within the adjacent barrel section and spaced to clear the metering pin, and means restricting fluid flow through said sleeve.

5. In a flow meter, the combination with a barrel including means providing a metering orifice, of a tapered metering pin having a portion movable through said orifice for varying its effective area, means guiding the pin for movement upon a predetermined path toward a position affording maximum flow through the orifice, and baffle means toward which said pin moves in approaching such position, said baffle means including a sleeve surrounding the projected path of pin movement and provided with means for restricting flow through the sleeve.

6. A flow meter as set forth in claim 5, in which the baffle means is spaced from the wall of the barrel sufficiently to provide an annular passage of a capacity substantially equal to that of the meter orifice.

7. A flow meter as set forth in claim 5, in which the metering pin is provided with a cushion at its upper end for engagement with the baffle, and an indicator flange at its lower end, said barrel having a calibrated window through which said flange may be viewed.

8. In a flow meter of the described type, a barrel member provided with a window opening and a cylindrical transparent lining wall, spanning the window opening, a ported coupling having a portion adapted to telescope within said barrel member with a gasket interposed between said coupling and said transparent liner, clamping bolts connecting the coupling and barrel member, and positioning nuts on the clamping bolts adapted to be adjusted into engagement with portions of the coupling to limit the clamping pressure and support the barrel member against tilting movement with reference to the coupling, whereby to avoid fracture of the lining wall.

9. In a flow meter, the combination of a vertical barrel having a transparent wall portion, a transverse partition in said barrel located above said transparent portion and having a metering orifice, a fixed vertical guide rod extending through the center of said orifice, a downwardly tapered metering pin having a bore through which said guide rod loosely extends and also having a cylindrical upper end portion substantially filling said orifice when the pin is in normal non-metering position, said pin also having its lower portion provided with an indicator, cushioning means for the respective ends of the metering pin and connections for delivering liquid upwardly through the barrel, said pin being free from contact or connection with any portion of the device other than its sliding connection with said guide rod, and the transparent portion of the barrel having calibrated gage means cooperative with said indicator to enable the rate of flow to be visually ascertained.

EMIL M. KRUEGER.